Figure 1:
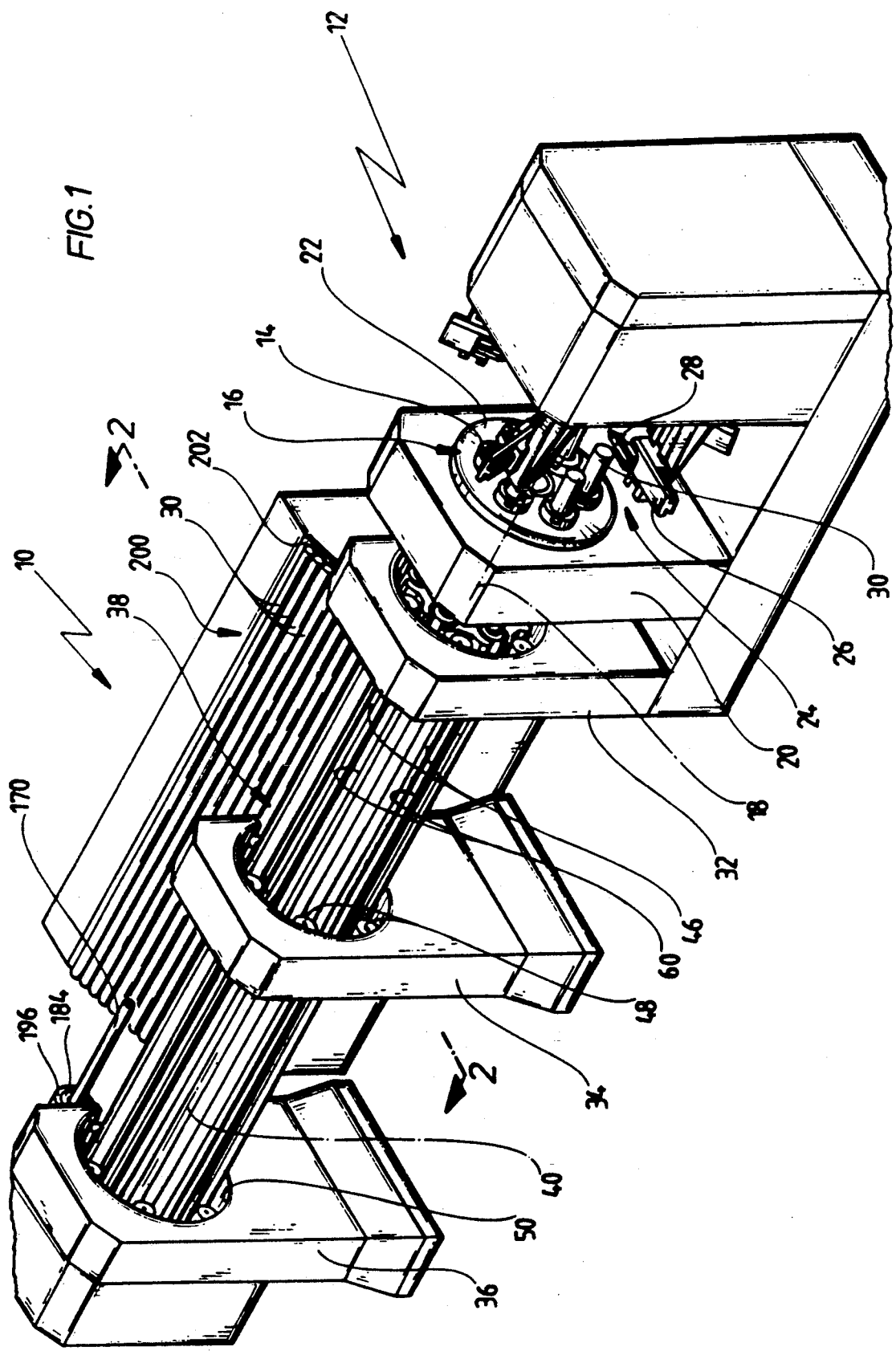

United States Patent [19]
Link

[11] Patent Number: 5,115,702
[45] Date of Patent: May 26, 1992

[54] BAR STOCK FEEDING MEANS

[75] Inventor: Helmut F. Link, Aichwald, Fed. Rep. of Germany

[73] Assignee: Index-Werke GmbH & Co. KG Hahn & Tessky, Esslingen, Fed. Rep. of Germany

[21] Appl. No.: 640,103

[22] Filed: Jan. 11, 1991

[30] Foreign Application Priority Data

Jan. 11, 1990 [DE] Fed. Rep. of Germany ....... 4000598

[51] Int. Cl.⁵ .............................................. B23B 13/04
[52] U.S. Cl. ..................................... 82/126; 29/37 R; 82/127; 82/129
[58] Field of Search ................... 29/27 C, 37 R, 37 A; 82/118, 119, 120, 129, 125, 126, 127; 414/14

[56] References Cited

U.S. PATENT DOCUMENTS

| | | | |
|---|---|---|---|
| 3,010,605 | 11/1961 | Jones, Jr. ................... | 29/37 R X |
| 4,292,864 | 10/1981 | Cucchi et al. .................... | 82/126 X |
| 4,407,176 | 10/1983 | Link ........................... | 82/127 |
| 4,953,429 | 9/1990 | Arisaka et al. .................... | 82/127 |

FOREIGN PATENT DOCUMENTS 1131069 9/1956 Fed. Rep. of Germany .
2044202 3/1972 Fed. Rep. of Germany .
3024766 9/1982 Fed. Rep. of Germany .

Primary Examiner—Z. R. Bilinsky
Attorney, Agent, or Firm—Leydig, Voit & Mayer

[57] ABSTRACT

In order to so improve a bar stock feeding means for machine tools comprising a longitudinal guide means on which several holders which each receive the bar stock in a guide means are held for movement in the longitudinal direction of the longitudinal guide means, and a drive means with which the holders are displaceable from an initial position in which they exhibit a maximum spacing from one another in the longitudinal direction into an end position on the machine tool side in which they exhibit a minimum spacing from one another in the longitudinal direction, that it can be sturdily and structurally simply made, it is proposed that the longitudinal guide means comprise a guide element having a longitudinal thread, that the holders be held in parallel alignment with one another by threaded rings engaging the longitudinal thread, and that the holders be movable in the longitudinal direction between the initial position and the end position by a relatively rotation between the guide element and the threaded rings initiated by the drive means. initiated by the drive means.

48 Claims, 12 Drawing Sheets

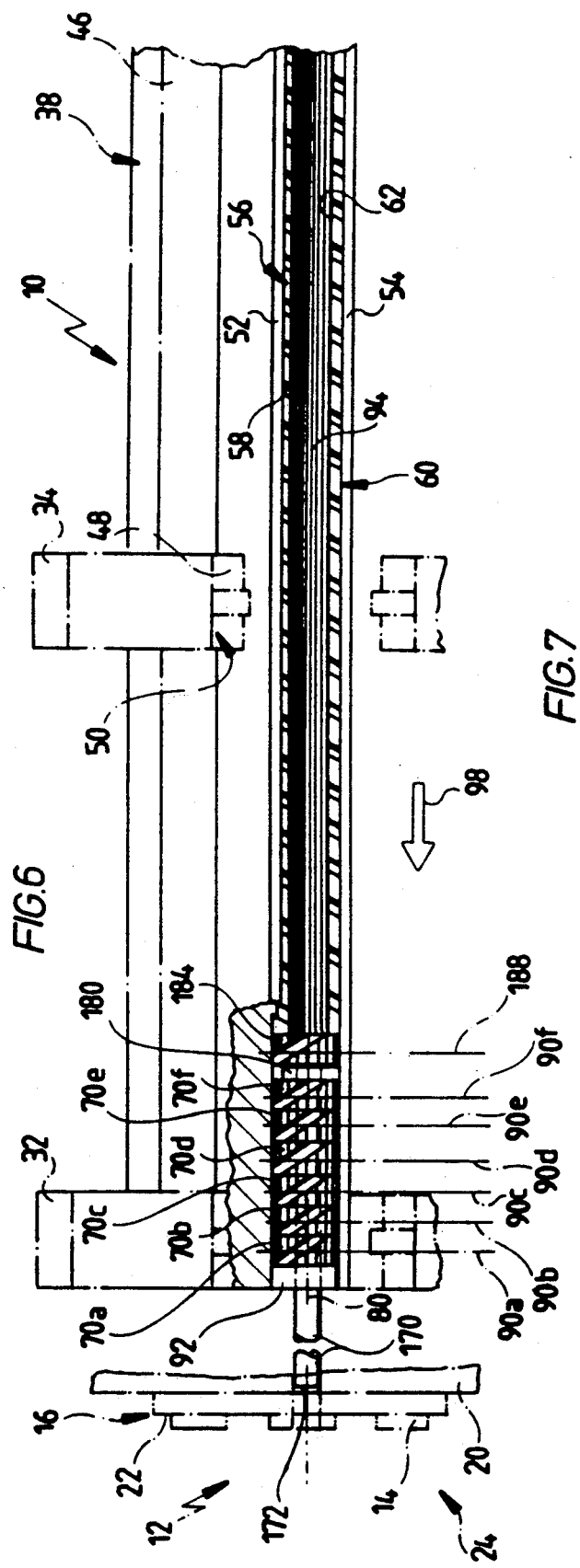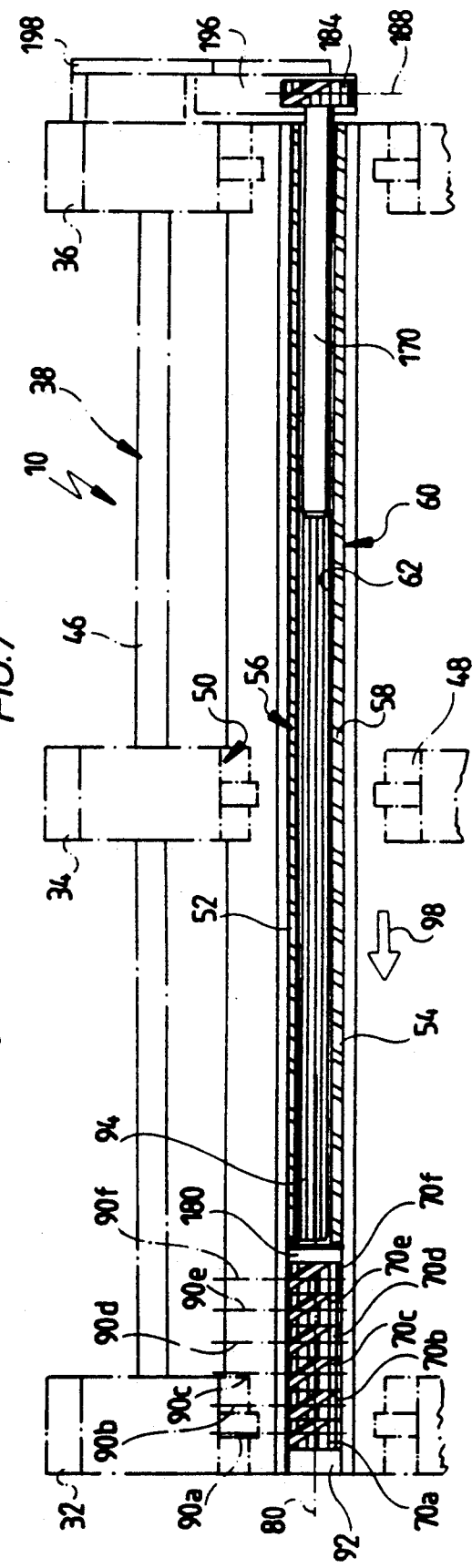

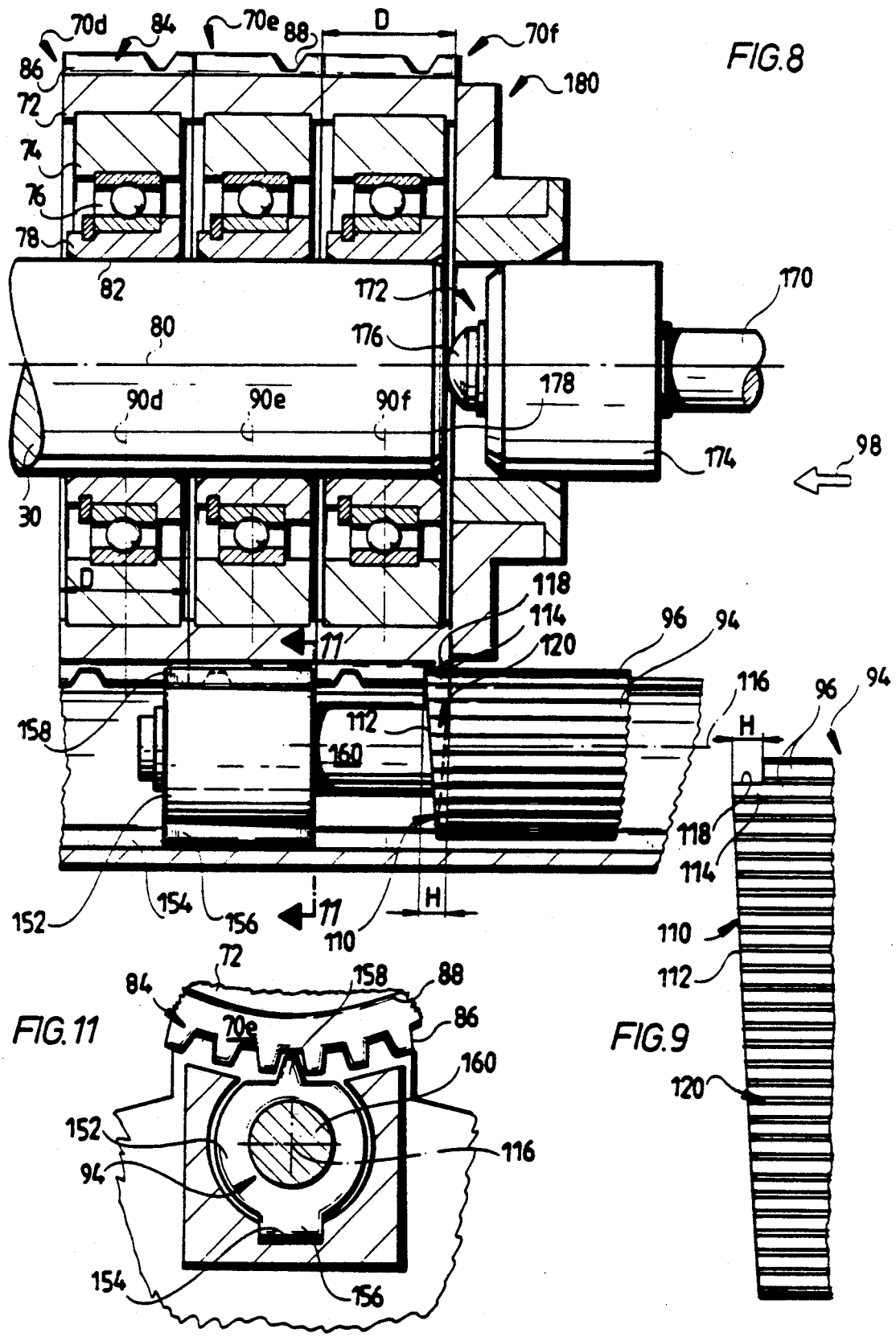

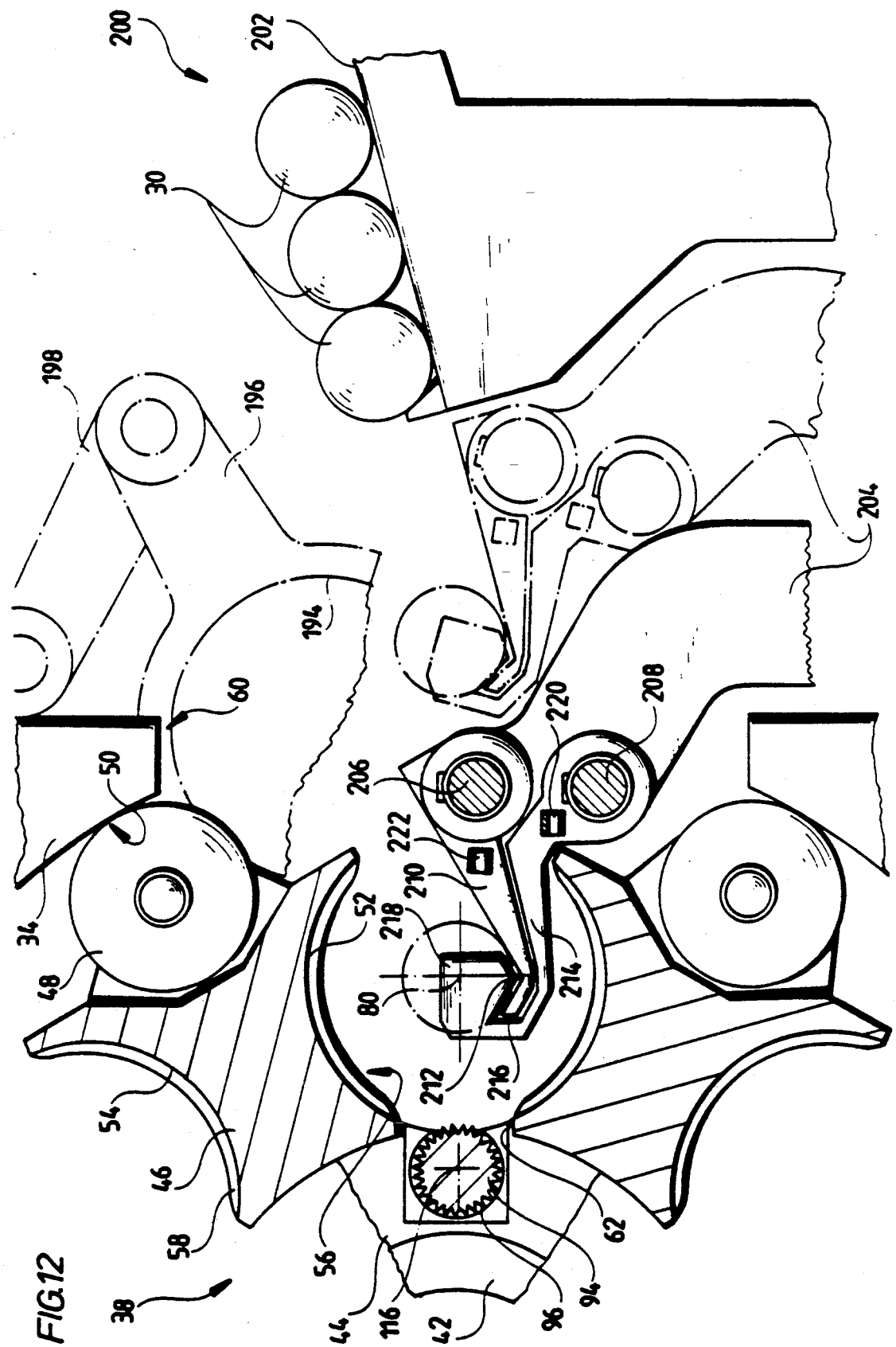

BAR STOCK FEEDING MEANS

The invention relates to a bar stock feeding means for machine tools comprising a longitudinal guide means on which several holders which each receive the bar stock in a guide means are held for movement in the longitudinal direction of the longitudinal guide means, and a drive means with which the holders are displaceable from an initial position in which they exhibit a maximum spacing from one another in the longitudinal direction into an end position on the machine tool side in which they exhibit a minimum spacing from one another in the longitudinal direction.

Such bar stock feeding means are known, for example, from german patent No. 30 24 766.

The problem with such bar stock feeding means is, however, that the structural solution disclosed in this publication involves high technological expenditure and is susceptible to damage.

The object underlying the invention is, therefore, to so improve a bar stock feeding means of the generic kind that it can be sturdily and structurally simply made.

This object is accomplished in accordance with the invention with a bar stock feeding means of the kind described at the beginning in that the longitudinal guide means comprises a guide element having a longitudinal thread, in that the holders are held in parallel alignment with one another by threaded rings engaging the longitudinal thread, and in that the holders are movable in the longitudinal direction between the initial position and the end position by a relative rotation between the guide element and the threaded rings initiated by the drive means.

The advantage of the inventive solution is to be seen in the fact that owing to the alignment and guidance of the holders by the threaded rings, the holders can in a simple way be aligned parallel to one another and displaceably arranged.

In particular, the inventive bar stock feeding means has the advantage that owing to its compact structure, it can in a simple way be extended to a bar stock feeding means for multiple-spindle machine tools.

An embodiment of the inventive bar stock feeding means wherein the longitudinal guide means comprises a guide channel has proven expedient.

However, an embodiment is particularly advantageous wherein the guide element is a threaded channel which forms the guide channel so the threaded channel incorporates both the characteristics of the guide channel and those of the guide element with a longitudinal thread.

In principle, this threaded channel can be a one-piece channel but—particularly in view of the necessary length—this is only possible with involved manufacturing methods.

It is, therefore, particularly advantageous for the threaded channel to be comprised of two threaded channel segments divided in the longitudinal direction.

With use of a threaded channel, it has proven particularly expedient for the threaded rings to have at least one thread course on their circumferential outer side and to thus run in the threaded channel.

In principle, the threaded channel could have any kind of thread. A multiple coarse thread which advantageously ensures the necessary feed speeds and the required positioning accuracy for the threaded rings has, however, proven particularly advantageous.

In order to achieve parallel alignment of the holders by the threaded rings with reliable accuracy, provision is made for the thread courses to be so arranged and to have such an arc length in the azimuthal direction that in each position of the thread courses of the threaded rings relative to the coarse thread these engage at at least three supporting points located at an angular spacing of 60 degrees from one another.

In accordance with the invention, either the guide element or the rings may be rotated to obtain relative rotary motion therebetween. For example, the guide element is to be stationary and the threaded rings rotatable or the threaded rings stationary and the guide element rotatable.

It has proven particularly advantageous, in particular for stability reasons, for the guide element to be held non-rotatably on a frame of the feeding means and for the threaded rings to be rotatable relative to the frame in order to bring about the movement of the holders relative to the guide element.

A drive means is expediently provided to enable movement of the holders in an advantageous way in the longitudinal direction of the guide element. In principle, this drive means could be of such design that each of the threaded rings has its own drive. It is, however, particularly expedient for the drive means to drive all of the threaded rings at the same speed and to interrupt the drive when the end position is reached.

The threaded rings can be driven in a particularly simple way by having an external toothing for engagement of a drive element of the drive means therein.

In principle, the thread with which the threaded rings are guided parallel to one another on the longitudinal thread could also serve as the external toothing of the threaded rings required for the driving so the rotation of the threaded rings relative to the guide element is simultaneously carried out via the external toothing. It is, however, advantageous for the external toothing to differ from the thread, and it is particularly expedient for the external toothing to have tooth profiles substantially parallel to the longitudinal direction so as to obtain as low forces as possible acting in the longitudinal direction on the drive element.

Therefore, provision is made in a particularly preferred embodiment for the thread course of the threaded ring with which the latter is guided on the guide element to also be machined in the external toothing of the threaded rings and, in this embodiment, the guide element is preferably designed as a threaded channel.

In the structurally simplest solution, provision is made for a single drive element to be provided for all of the threaded rings.

With a threaded channel designed as guide element, the question arises as to how the drive element is preferably to be integrated into the threaded channel. This is particularly simple in the case where the threaded channel is comprised of at least two threaded channel segments and the drive element is arranged between the two threaded channel segments.

Since, in the inventive solution, all the threaded rings move at the same speed when they are driven by a common drive element, provision is made in an advantageous further development of this solution for the threaded rings in the end position to be free from a rotational connection with the drive element but to be in rotational connection with the drive element in all other positions so it is possible to successively place the threaded rings in the end position and leave them positioned therein and hence keep the spacing between the threaded rings in the end position as small as possible, preferably to position the threaded rings as a set lying side by side in this position.

This is achieved in a preferred structural solution by the drive element being displaceable in the longitudinal direction from an initial position in which it is in rotational connection with all of the threaded rings through individual intermediate positions in which it is free from a rotational connection with those threaded rings standing in the end position, into an end position in which it is free from a rotational connection with all of the threaded rings so that in this end position of the drive element, all of the threaded rings can remain free from a rotational connection in the end position.

To make it possible for the drive element to drive further elements or to assume further tasks in the end position independently of the threaded rings standing in the end position, provision is advantageously made for the drive element to be fixable in the end position with respect to its longitudinal displaceability.

A design of the drive element wherein the latter is a pinion shaft is particularly expedient.

In this case, it is preferably for the rotational connection between the drive element and the threaded rings to be established by engagement of the external toothing of the pinion shaft in the external toothing of the threaded rings.

To enable displacement of the drive element in a simple way in the longitudinal direction, a displacement means is preferably provided for this purpose.

It is particularly expedient for the displacement means to be of such design that a foremost area of engagement of the drive element which is engageable with the threaded rings to be displaceable by step gearing elements in the individual steps in the longitudinal direction.

Such step-wise movement of the area of engagement can be used in a particularly advantageous way with holders deposited as a set in the end position when the thickness of the holders—seen in the longitudinal direction of the guide element—is an integral multiple of a step so that always after a fixed number of steps, the respective next holder, in particular the threaded ring thereof, disengages from the drive element.

In principle, the step gearing elements may be of any design. In a particularly preferred solution, provision is made for the step gearing elements to be formed by a thread which continuously displaces the drive element in the longitudinal direction and by an end section of the drive element in the form of a screw thread extending in the same direction and having the same pitch as the thread displacing the drive element. The movement of the drive element by the thread is first compensated by this screw thread until the screw thread is terminated and starts at the beginning again with a step so that in the region of the step which extends between the end of the screw thread and the beginning thereof, there is an abrupt movement of the area of engagement.

It is particularly expedient for the pitch of the screw thread to correspond to the pitch of the thread displacing the drive element so the are of engagement remains at a standstill until the step is reached and advances abruptly in the region of this step.

In the above description of the embodiments, it was only explained how the holders or threaded rings are to be placed in the end position and decoupled from the drive element.

However, in order to prevent displacement of the threaded rings relative to one another in the end position, provision is made for the threaded rings to be lockable in the end position.

In principle, all kinds of locking units are conceivable for this purpose. A locking shoe displaceable in the longitudinal direction represents a particularly preferred configuration for the locking.

The locking shoe could, in principle, be designed so as to fix all of the threaded rings standing in the end position. In the simplest case, it is, however, sufficient for the locking shoe to fix the respective last threaded ring placed in the end position and to position with it the threaded rings located in front of it.

In a structurally particularly simple solution, provision is made for the locking shoe to engage the external toothing of the threaded rings standing in the end position and to fix these in a rotationally fixed manner relative to the guide element.

It has proven expedient for the threaded rings to be arranged with their external toothings in alignment in the end position so the locking shoe can wander on from threaded ring to threaded ring when only the respective last threaded ring placed in the end position is to be fixed.

In particular in the case of provision of a locking shoe which engages in the external toothings, it is expedient for this locking shoe to be guided in a rotationally fixed manner.

In connection with the provision of the locking shoe, it has proven expedient, particularly when it is merely to fix the last threaded ring placed in the end position, for the locking shoe to be step-wise displaceable in the longitudinal direction via a step gearing.

In particular, to enable the step gearing to be designed with similar gearing elements as those of the step gearing for displacing the area of engagement, provision is made for the locking shoe to be held at a front end of the drive element so the thread displacing the drive element can be used for both step gearings.

In the above description of the embodiments within the scope of the invention solution, it was not explained where the guide means comprised by the holders for the bar stock are to be arranged. It is quite conceivable within the scope of a solution for the threaded rings to be arranged in a threaded channel and the guide means outside of the latter. It is, however, particularly advantageous for the guide means for the bar stock to be arranged in the threaded channel and for the bar stock to thus be guided within the threaded channel.

In a further development of this particularly expedient embodiment, the holders are enclosed by the threaded channel and provided with the threaded rings on their circumferential outer side so the entire holders lie in the threaded channel, thereby profiting from its longitudinal stability and, in addition, being protected by the threaded channel.

It is then expedient for the guide means for the bar stock to hold the latter in coaxial alignment with the threaded channel and for the axis of the bar stock to coincide with the spindle axis and the longitudinal axis of the threaded channel as well as with the axis of rotation of the threaded rings.

In this case, it has proven particularly advantageous for the threaded channel to comprise a loading opening extending in the longitudinal direction for the bar stock, and the loading opening is expediently arranged between the two threaded channel segments.

This inventive solution can be further supplemented by the drive element being arranged opposite the loading opening so the loading opening and the drive element lie between the two threaded channel segments but on opposite sides of the threaded channel.

In the above description of the embodiments, no details were given as to how the bar stock is to be advanced as the function of the holders was so far merely to be seen in that of guiding the bar stock. Within the scope of the inventive solutions, it is particularly advantageous to provide a feed rod which is displaceable in the longitudinal direction.

This feed rod has likewise to be drivable in order to advance the bar stock. In general, a separate drive can be provided for the feed rod but since the movement of the feed rod preferably occurs at the same speed as the movement of the holders, provision is preferably made for the feed rod to be held on a threaded feed ring which is held for displacement in accordance with the threaded rings on the guide elements.

In addition, it is particularly expedient for the feed rod to be advanced jointly with the holders, i.e. with the same drive element as for the threaded rings.

Provision is preferably made for the drive element to be in engagement in both the initial position and the end position with the threaded feed ring so long as it is positioned in a feed position for displacement coaxially with the threaded rings so that in contrast with the threaded rings comprised by the holders, there is no decoupling of the drive in the end position.

Since the feed rod should usually have such a length that the bar stock can essentially be used up completely in the spindle, provision of a feed rod increases the length of the inventive bar stock feeding means as the latter usually has to be extended by the length of the feed rod to enable insertion of the next bar stock, in particular when the bar stock is inserted from the side through the loading opening.

Therefore, an embodiment is particularly advantageous wherein the feed rod in a retracted position can be moved from a feed position in alignment with the guide means into a loading position so the feed rod does not cause a disturbance during loading of new bar stock and this embodiment can, therefore, be shortened by the length of the feed rod.

In a structurally simple and advantageous embodiment, provision is made for the feed rod to be movable from the feed position into the loading position.

In particular, a pivoting means is provided for pivoting the feed rod into the loading position which is offset laterally parallel to the feed position.

Such a pivoting means offers additional advantages when it has in addition to the laterally offset parallel loading position, an approachable loading position wherein the bar stock is slightly displaceable in the direction opposite to the lathe and hence when the feed rod is used again, slight displacement in the longitudinal direction is imparted to it in addition to its lateral displacement in order to insert a front end of the feed rod into a centering bushing provided in the last holder so that the feed rod is guided coaxially with the bar stock by both the threaded feed ring and the centering bushing on the last holder.

The pivoting means is expediently designed so as to pivot an end section of the guide element which receives the threaded feed ring in the retracted position and in which the threaded feed ring is positionable.

As mentioned at the beginning, the advantage of the inventive solution is, in particular, to be seen in the fact that several longitudinal guide means with holders can be combined in a stock feed drum, with one longitudinal guide means with several holders being available for one spindle of a multiple-spindle automatic lathe.

It is particularly advantageous for the stock feed drum to be rotationally fixedly connected to a spindle drum of the machine tool and so, in the simplest case, the rotation of the stock feed drum is driven via the rotation of the spindle drum.

In order to improve the level of automation of the inventive bar stock feeding means, it is advantageous for a loading means to be provided for the bar stock.

In particular, the loading means is designed so as to comprise loading arms which can be pivoted into the guide channel through the loading openings.

The loading arms are preferably provided with prisms for positioning the bars in alignment in the guides.

It is particularly expedient for the loading arms to be held on a longitudinal guide means and to be displaceable along this longitudinal guide means. In an insertion position, the loading arms preferably exhibit a constant maximum spacing from one another and in a retracted position are pushed together as a set with the bar stock already being inserted into the holders of the machine tool in this retracted position.

In addition, it has proven particularly advantageous for the loading means to comprise a push-in arm which is movable in the longitudinal direction of the guide element to push the bar stock into the guide means provided on the holders and into the spindle, during which the guide means are simultaneously moved apart.

The inventive bar stock loading means is an independent invention which, in general, can be used in a bar stock feeding means according to the preamble of claim 1.

Figure 2:
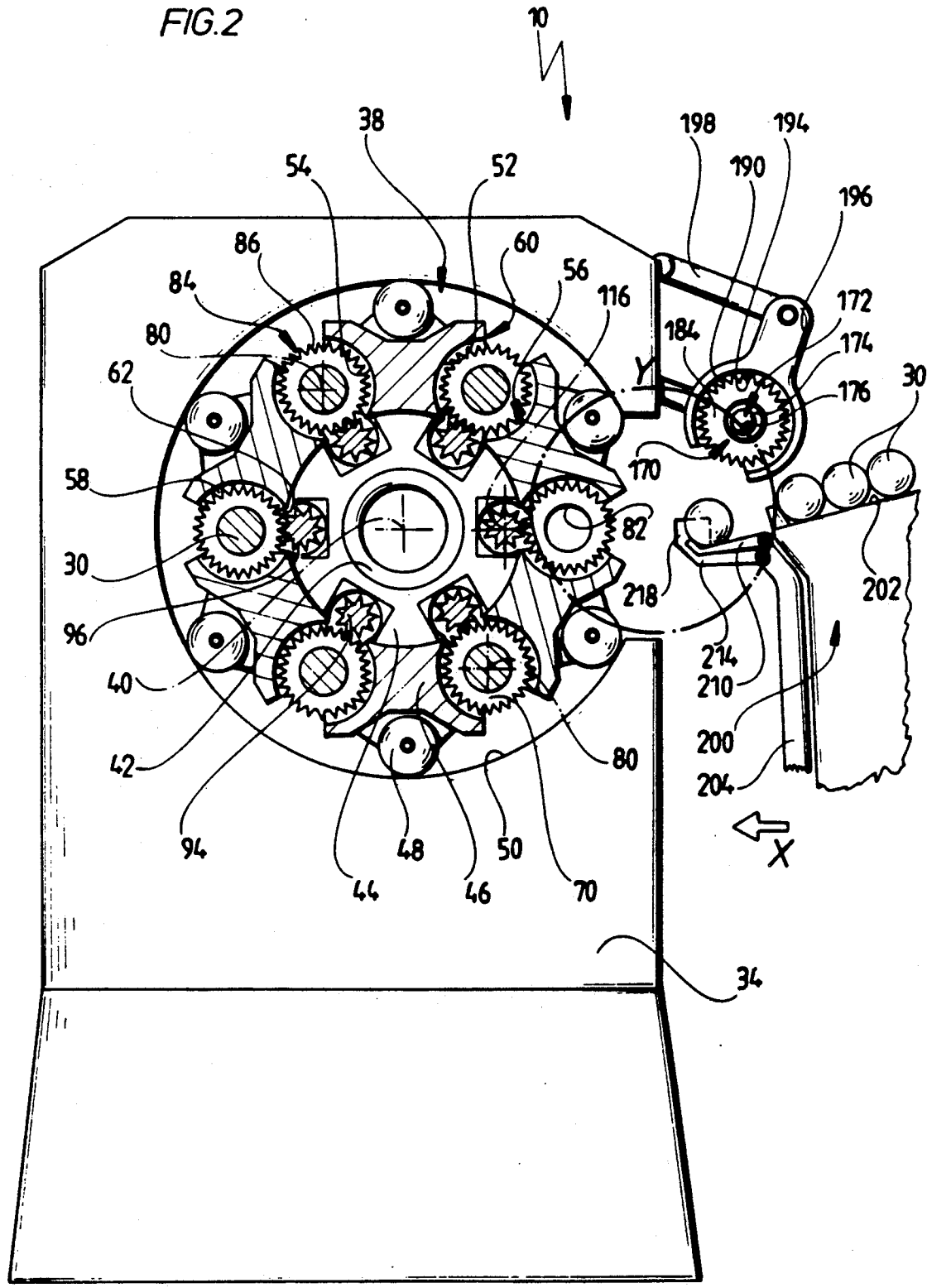
Figure 3:
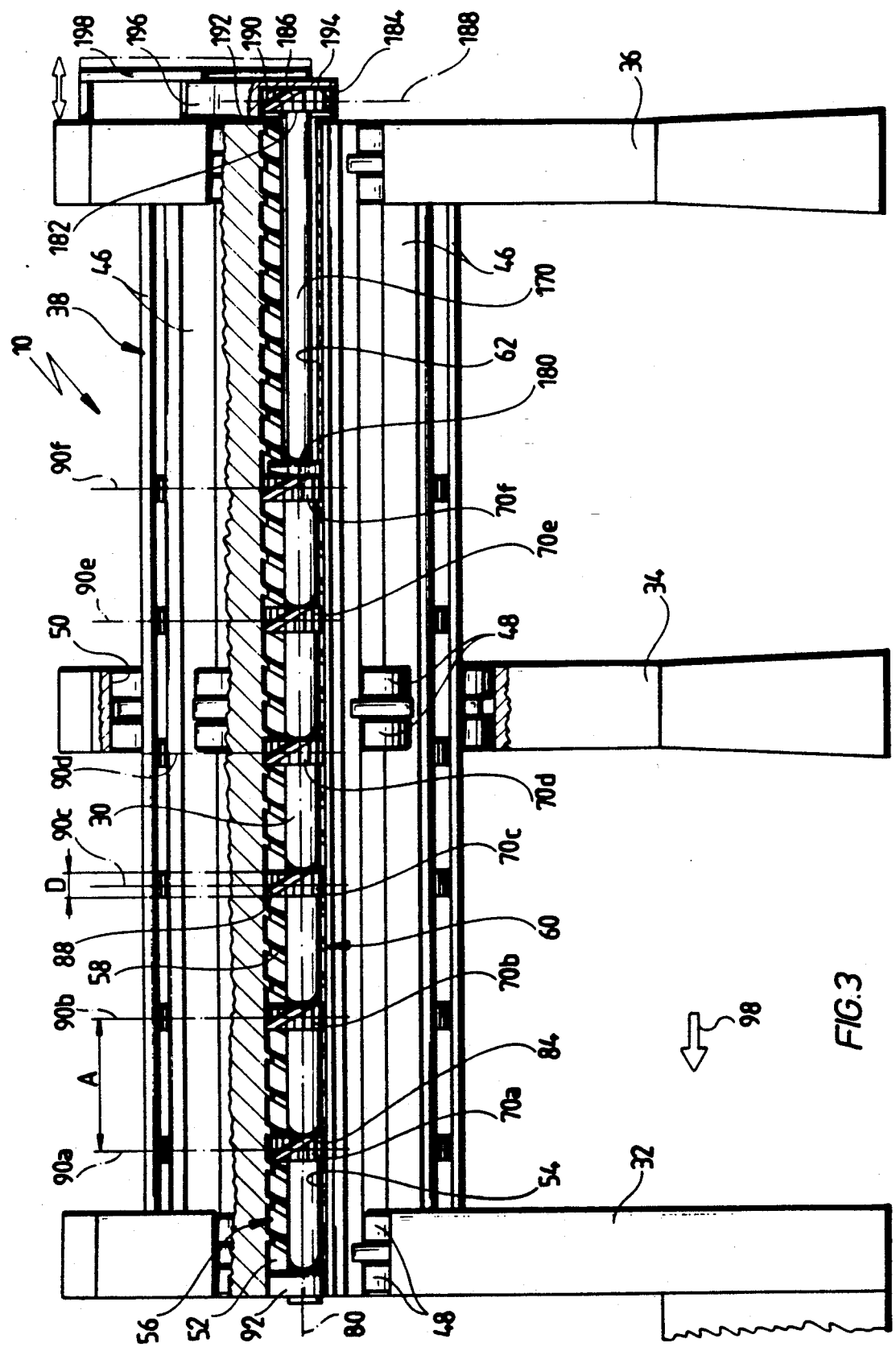
Figure 4:
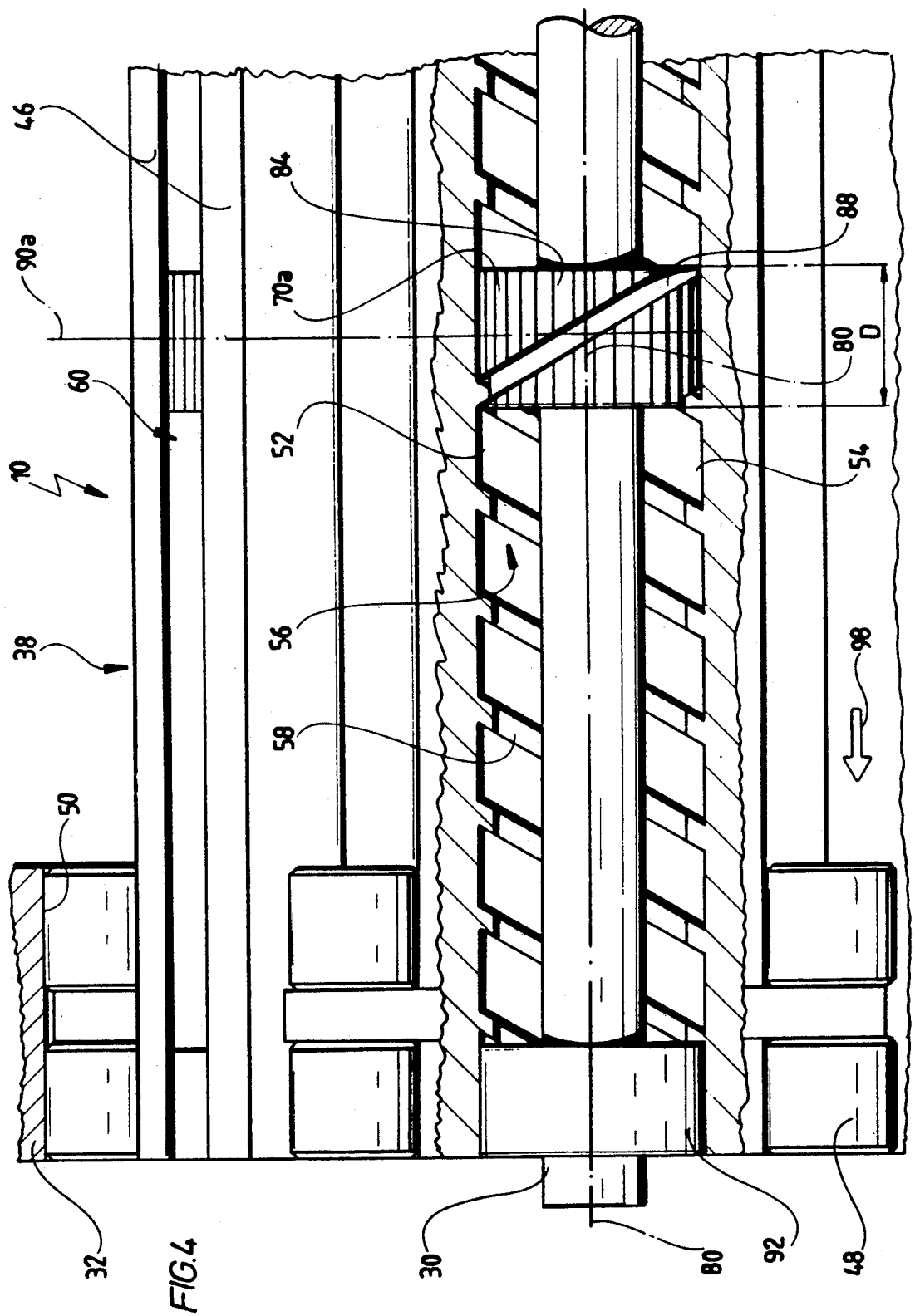
Figure 5:
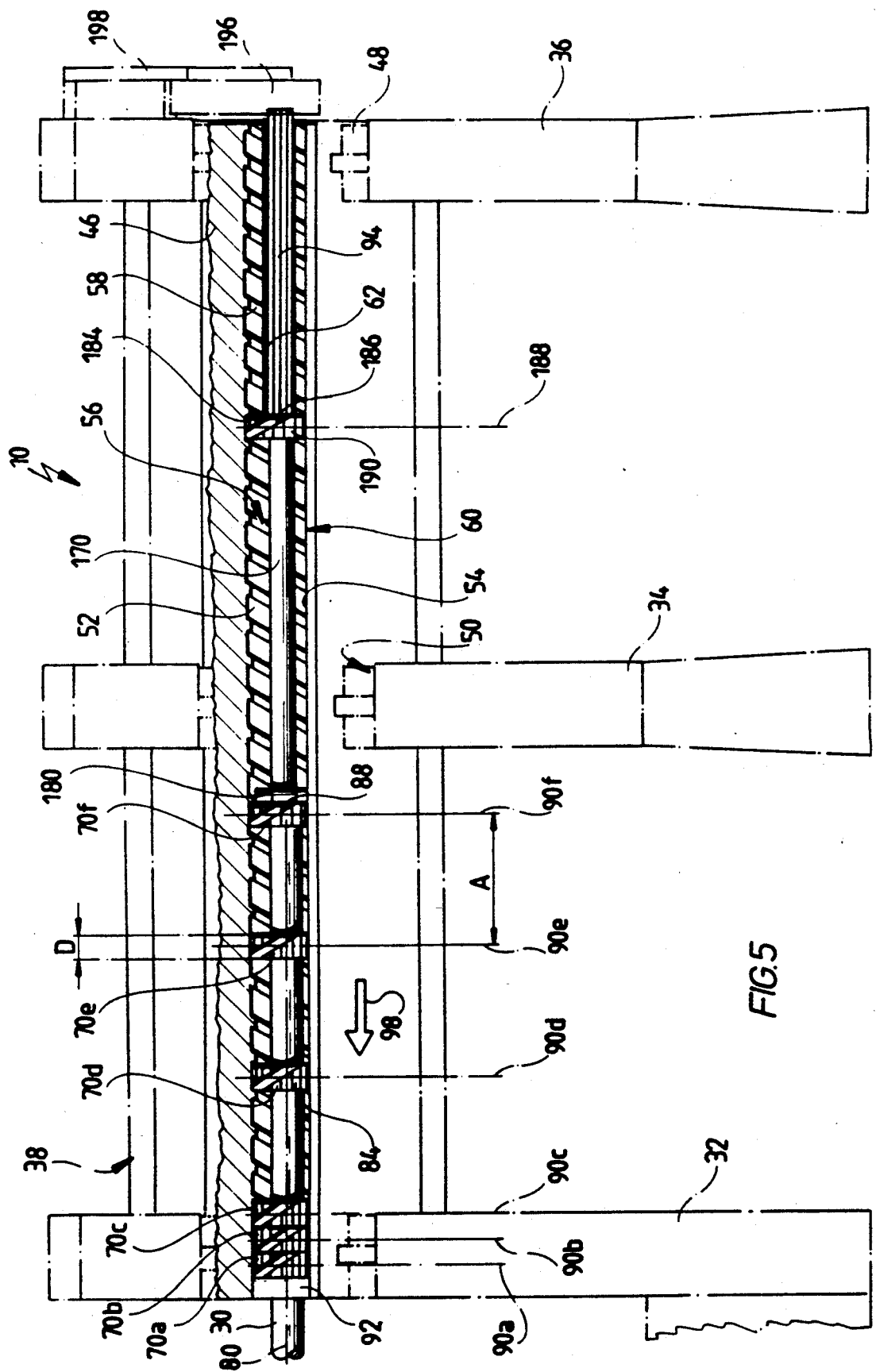
Figure 10:
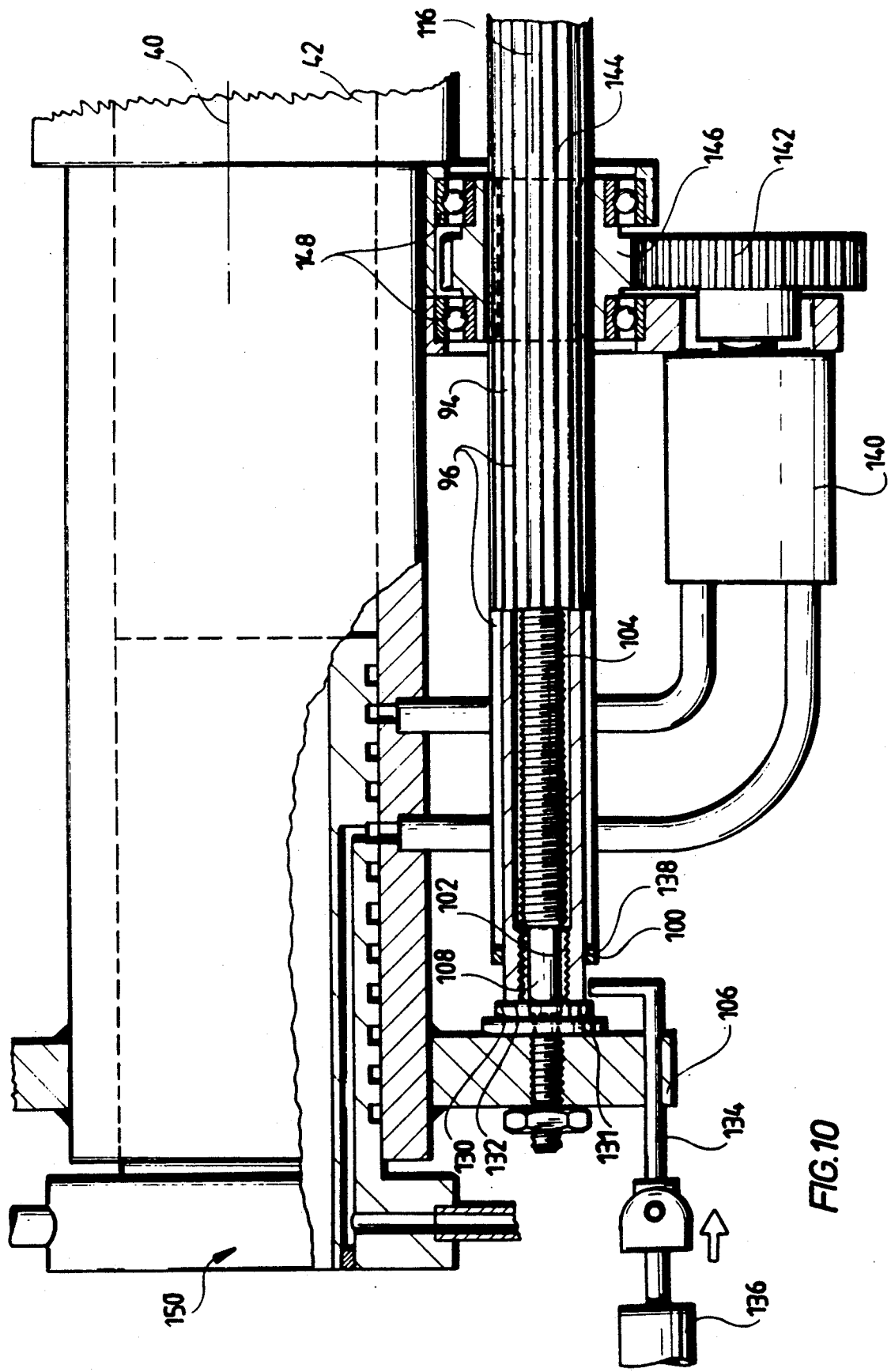
Figure 13:
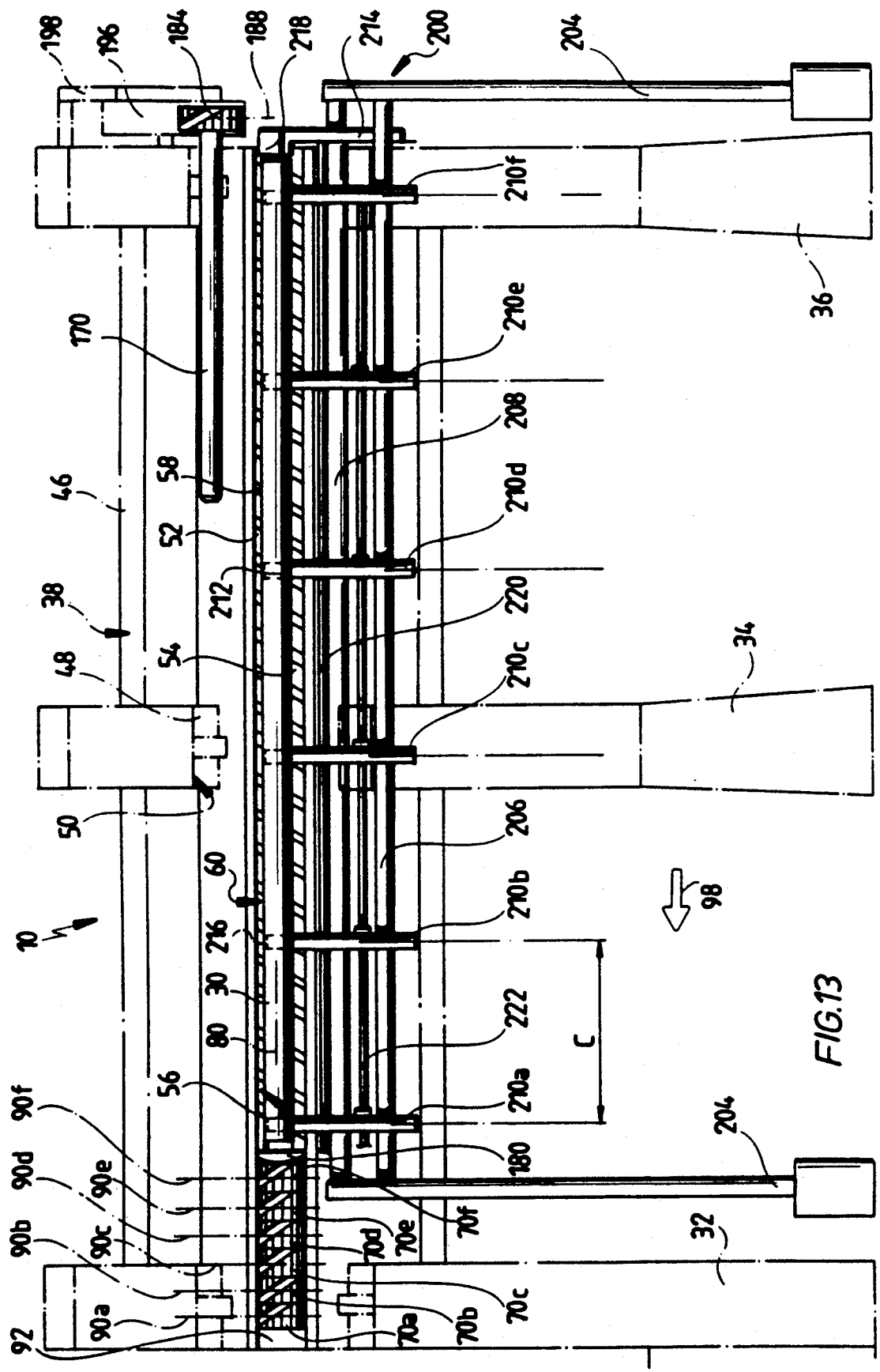
Figure 14:
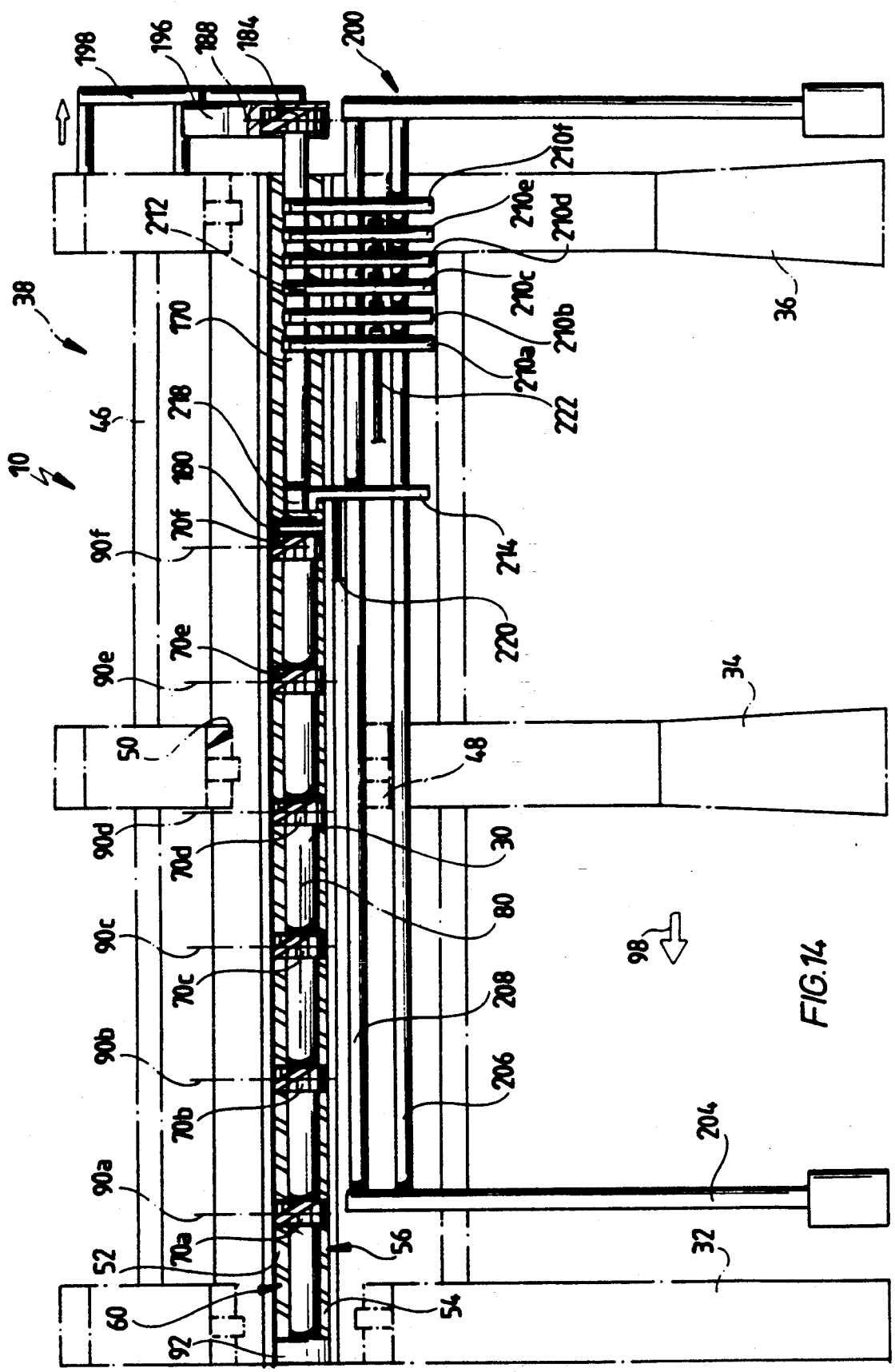
Figure 15:
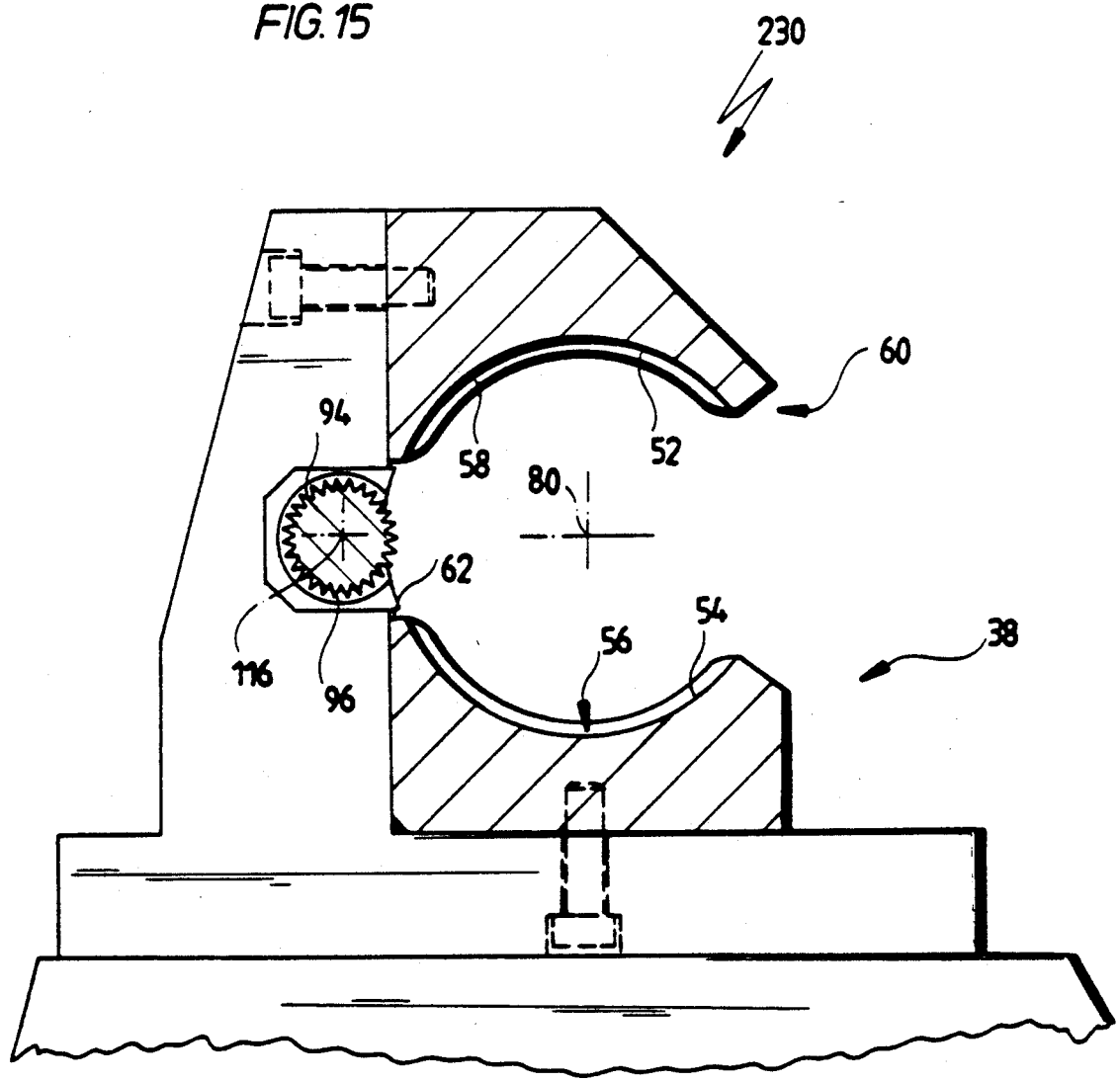

Further features and advantages of the inventive solution are to be found in the following description and in the appended drawings of several embodiments. The drawings show:

FIG. 1 a perspective overall view of an inventive bar stock feeding means built onto a multiple-spindle lathe;

FIG. 2 a section along line 2—2 in FIG. 1;

FIG. 3 a side view in the direction of arrow X in FIG. 2 with bearing rings standing in the initial position;

FIG. 4 an enlarged partial view of a front region in FIG. 2;

FIG. 5 an illustration similar to FIG. 3 with part of the bearing rings standing in the end position;

FIG. 6 a view similar to FIG. 3 with all of the bearing rings standing in the end position and the feed rod pushed through to the front;

FIG. 7 a view similar to FIG. 6 with the feed rod retracted;

FIG. 8 a section through the last bearing rings standing in the end position with the pinion shaft disengaging from the last bearing ring;

FIG. 9 an unwound illustration of an end section of the pinion shaft;

FIG. 10 a partial section through a rear end of the pinion shaft with its displacement and rotary drive;

FIG. 11 a section along line 11—11 in FIG. 8;

FIG. 12 an enlarged partial illustration of a region Y in FIG. 2;

FIG. 13 an illustration similar to FIG. 3 with a loading means standing in the insertion position;

FIG. 14 an illustration similar to FIG. 13 with the loading means standing in the insertion position, the bearing rings standing in the initial position and the bar stock inserted; and FIG. 15 a section similar to FIG. 2 through a second embodiment of a bar stock feeding means for a single-spindle machine tool.

A first embodiment, designated in its entirety 10, of an inventive bar stock feeding means illustrated in FIG. 1 is built onto a multiple-spindle lathe, designated in its entirety 12, wherein several spindles 14 are arranged in a spindle drum 16 for rotation about a spindle drum axis 18. The spindle drum 16 is mounted in a machine frame 20 and with a front side 22 faces a work area 24 of the multiple-spindle lathe 12 in which tools 28 held on slides 26 are provided for machining bar stock 30 which protrudes beyond the front side 22 and is held in the individual spindles 14.

This bar stock 30 is fed to the spindles 14 of the spindle drums 16 by the bar stock feeding means. As indicated schematically in FIG. 1, the inventive bar stock feeding means 10 comprises, for example, three supporting units, namely a front supporting unit 32 held on the machine frame 20 of the lathe 12, a middle supporting unit 34 and a rear supporting unit 36. In these supporting units, a stock feed drum designated in its entirety 38 is mounted for rotation about a center axis 40 arranged coaxially with the spindle drum axis 18 and is rotationally fixedly connected to the spindle drum 16 so the stock feed drum 38 rotates jointly with the spindle drum 16.

The stock feed drum 38 illustrated in FIG. 2 comprises a central tube 42 which is coaxially aligned with the center axis 40 and carries in the region of the supporting units 32, 34 and 36 a flanged ring 44 having mounted on its circumferential outer side X-shaped carriers 46 which are arranged at an identical angular spacing and extend parallel to the center axis 40 over the entire length of the stock feed drum 38. Each of these X-carriers 46 carries a roller 48 on its outer side facing away from the flanged ring 44. With these rollers 48, the stock feed drum 38 is supported in a bearing bore 50 in each of the supporting units 32, 34 and 36.

The facing sides of the X-carriers 46 following one another in the circumferential direction of the flanged ring 44 each form half shells 52 and 54 of a threaded channel designated in its entirety 56 which comprises inwardly protruding thread courses of a multiple coarse thread in the region of the half shells 52 and 54.

The half shells 52 and 54 are spaced from one another so the threaded channel 56 has a loading opening 60 pointing radially outwardly in relation to the stock feed drum 38 and a radially inwardly pointing engagement opening 62, the purpose of which is explained hereinbelow.

As shown, in particular in FIGS. 3 to 7, several bearing ring assemblies 70a to f are provided in the threaded channel. As illustrated in FIG. 8, these each have a radially outward threaded ring 72, a damping ring 74 arranged radially within the threaded ring 72, a ball bearing 76 arranged within the damping ring 74 and held by the latter and a guide bushing 78 held by the ball bearing 76. All of the bearing ring assemblies 70a to f are rotatably mounted in the threaded channel 56 coaxially with the longitudinal axis 80 of the threaded channel 56 and their guide bushings 78 with the ball bearings 76 are likewise aligned so as to be rotatable coaxially with the longitudinal axis 80 relative to the damping ring 74 and the threaded ring 72.

The guide bushings 78 fittingly guide the bar stock 30 through their center bore 82 through which the bar stock 30 can be pushed in the direction of the longitudinal axis 80.

The threaded ring assemblies 72 of the bearing rings 70a to f are designed so as to have on their circumferential outer side a toothing 84 with tooth profiles 86 extending substantially parallel to the longitudinal axis 80. The threaded rings 72 also have threaded courses 88 machined as a recess in the toothing 84 to match the thread courses 58 of the coarse thread of the threaded channel 56. With these thread coursed 88 extending in the thread courses 58, the bearing ring assemblies 70a to f constituting holders for the bar stock 30 are always guided by the threaded channel 56 such that the center bores 82 of the guide bushings 78 are in alignment with one another and all of the bearing rings 70a to f extend in planes 90a to f which are aligned parallel to one another and stand perpendicular to the longitudinal axis 80.

In FIG. 3, the bearing ring assemblies 70a to f are arranged in an initial position in which the planes 90a to f and hence also the bearing ring assemblies 70a to f exhibit a constant spacing A from one another. The first bearing ring assembly 70a is also arranged at the spacing A from a fixed ring 92 terminating the threaded channel 56 on the lathe side.

In this initial position, the bearing ring assemblies 70a to f carry as holders the bar stock 30, more particularly, in such a way that a bar stock axis coincides with the longitudinal axis 80 of the threaded channel 56 and, in addition, the longitudinal axis 80 is aligned coaxially with a spindle axis of the spindles 14.

The displacement of the bearing ring assemblies 70a to f in the threaded channel 56 is carried out by rotation of the bearing ring assemblies 70a to f relative to this threaded channel 56, with the threaded channel 56 guiding the bearing ring assemblies 70a to f with their planes 90a to 90f in parallel alignment with one another. A pinion shaft 94 discernible in FIG. 2 is provided for rotating the bearing ring assemblies 70a to f. The pinion shaft 94 is arranged in the engagement opening 62 between the half shells 52 and 54 and mounted such that it engages with its external toothing 96 in the toothing 84 of the threaded rings 72 and is thereby capable of rotating the threaded rings 72 relative to the threaded channel 56. In the initial position shown in FIG. 3, all of the threaded ring assemblies 72 of all of the bearing rings 70a to f are in engagement with the pinion shaft 94.

When the pinion shaft 94 is rotated by a means explained hereinbelow, the threaded rings 72 rotate with their thread courses 88 in the thread courses 58 of the coarse thread, as shown, in particular on an enlarged scale, in FIG. 4, and so all of the bearing ring assemblies 70a to f are movable at the same speed in a forward direction 98 towards the fixed ring 92.

Once the first bearing ring assembly 70a comes to rest against the fixed ring 92, it has reached its end position and rotation thereof by the pinion shaft 94 is interrupted. The same applies when the second bearing ring assembly 70b comes to rest against the first bearing ring assembly 70a and, as shown in FIG. 5, the third bearing ring assembly 70c against the second bearing ring 70b and so in the illustration in FIG. 5, only the bearing ring assemblies 70d, e and f are still driven by the pinion shaft, more particularly, until all of the bearing ring assemblies 70a to f have reached their end positions, as shown in FIG. 6, and form a bearing ring assembly set made up of bearing ring assemblies 70a to f lying closely side by side and, for its part, resting against the fixed ring 92.

In the end position illustrated in FIG. 6, no more bearing ring assemblies 70a to f are being driven by the pinion shaft 94.

As is likewise apparent from the bearing ring assemblies 70a to f illustrated in the end position in FIG. 8, the toothings 84 of all of the bearing ring assemblies 70a to f are, in addition, machined such that the tooth profiles 86 are in alignment with one another in the end position.

The decoupling of the individual bearing ring assemblies 70a to f reaching the end positions from the pinion shaft 94 is carried out by displacement of the pinion shaft 94 in the direction opposite to the forward direction 98.

For this purpose, as illustrated in FIG. 10, there is provided on a rear end 100 of the pinion shaft 94 an internally threaded section 102 penetrated by a threaded rod 104. The threaded rod 104 is fixedly held with a holding bracket 106 on the stock feed drum 38, in particular on the central tube 42. The threaded rod 104 also has a thread-free section 108, the extent of which parallel to the direction of the longitudinal axis 80 corresponds at least to the length of the threaded section 102 in this direction, as likewise illustrated in FIG. 10.

Furthermore, the pinion shaft 94 is constructed in its front end region 110 facing the lathe 12 with an end face 112 in the form of a screw thread 114 extending about an axis of rotation 116 of the pinion shaft 94. Upon rotation about the axis of rotation 116, the end face 112 extends by the amount of one pitch H in the direction towards the lathe 12, but after this rotation jumps back in the form of a step 118 by the amount of the pitch H, as is apparent from an unwinding of the end section 110 illustrated in FIG. 9.

Since the pitch H of the screw thread 114 on the end section 110 corresponds to a pitch of the threaded rod 104 and of the threaded section 102, upon rotation of the pinion shaft 94 about its axis of rotation 116, each point of the end face 112 is displaced by exactly the amount of the pitch H in the direction opposite to the forward direction 98. As a result of this, an area of engagement 120 of the external toothing 96 of the pinion shaft 94 with the axis of rotation 116 immediately adjoining the end face 112 does not move until the step 118 is reached, as the displacement of the entire pinion shaft 94 in the direction opposite to the forward direction 98 occurring with the rotation of the pinion shaft about the axis of rotation 116 is compensated by the screw thread 114 rising in the forward direction, more particularly, until the step 118 is reached. When the step 118 is reacted, the area of engagement 120 then jumps back by one step H in the direction opposite to the forward direction.

Hence the end section 110 provided with the screw thread 114 and the thread of the threaded rod 104 and of the threaded section 102 together form a step gearing by means of which the area of engagement 120 after each rotation of the pinion shaft 94 about the axis of rotation 116 is moved back by one step with the step width H in the direction opposite to the forward direction 98.

In addition, a thickness D of the bearing ring assemblies 70a to f designating the extent the bearing ring assemblies 70a to f in the direction of the longitudinal axis 80 is so selected that it is an integral multiple of the step width H and hence also of the pitch H so the pinion shaft 94 abruptly disengages with its area of engagement 120 from the toothing 84 of each bearing ring assembly 70a to f as it reaches the end position.

Furthermore, in the initial position the spacing A of the bearing ring assemblies 70a to f are also so selected that starting from the initial position, the first bearing ring assembly 70a has reached its end position precisely when the pinion shaft 94 has moved through the thread of the threaded rod 104 and of the threaded section 102 by the amount D in the direction opposite to the forward direction 98 so that precisely when the first bearing ring assemblies 70a has reached the end position, the area of engagement 120 suddenly disengages from the toothing 84 of the first bearing ring assembly 70a. After exactly the same number of rotations of the pinion shaft 94, the second bearing ring assembly 70b has precisely reached its end position so the are of engagement 120 likewise suddenly disengages from the toothing 84 thereof and, finally, as illustrated in FIG. 8, after a corresponding number f rotations, the last bearing ring assembly 70f has also reached the end position and so precisely at that moment the area of engagement 120 disengages from the toothing 84 thereof.

If, for example, the thread of the threaded rod 104 and of the threaded section 102 has a pitch of 5 mm and the bearing ring assemblies 70a to f have a width of 25 mm, five rotations are required to move the pinion shaft 94 by the amount D in the direction opposite to the forward direction. The step 118 then also automatically has the height H of 5 mm. In the number of rotations required by the pinion shaft 94, the step-down ratio of the pinion shaft 94 to the threaded rings 72 has to be taken into account. If this is, for example, 10:3 with a pitch of 200 mm in the threaded channel 56, the bearing ring assemblies 70a to f exhibit a spacing A of 300 mm from one another.

After the last bearing ring assembly 70f has reached the end position as illustrated in FIG. 8 and the area of engagement 120 has abruptly moved by the amount of the step width H and hence this bearing ring assembly 70f has decoupled from the pinion shaft 94, the threaded section 102 will also have moved so far on the threaded rod 104 that it lies over the thread-free section 108 of the threaded rod 104 and is thus disengaged from it and so no further displacement of the pinion shaft 94 occurs in the direction opposite to the forward direction 98. This position of the pinion shaft 94 is designated its end position whereas the position of the pinion shaft in which it is displaced fully in the forward direction 98 and all of the bearing ring assemblies 70a to f are standing in their initial position is designated initial position of the pinion shaft s the area of engagement 120 travels abruptly from the initial position to the end position of the pinion shaft 94 with the step width H.

In order to fix the pinion shaft 94 in this end position, there is provided on the holding bracket 106 a holding device, for example, in the form of a holding magnet 130 which is held by a rotary bearing 131 on the holding bracket 106 and acts upon a rear end face 132 of the pinion shaft 94, thereby pulling the latter towards itself.

Hence, so long as the holding magnet 130 holds the pinion shaft 94 pulled towards the rear, independently of rotation of the pinion shaft, displacement of the latter in the direction of its rotational axis 116 is no longer possible.

A push bar 134 is provided to enable the threaded section 102 to be brought into engagement with the threaded rod 104 again. The push bar 134 is displaceable by an actuating device 136, for example, a hydraulic cylinder, in the direction of the axis of rotation 116 and presses against a ring flange 138 arranged at a spacing from the end face 132 in order to move the pinion shaft 94 away from the holding magnet 130, more particularly, until the threaded section 102 engages the threaded rod 104 again.

The pinion shaft 94 is driven in the direction of its axis of rotation 116 via a hydraulic motor 140 which acts by means of a drive pinion 142 on a pinion 146 slidingly seated on a rear end piece 144 of the pinion shaft 94 and positively connected to the latter and held immovably in the direction of the axis of rotation 116 on the stock feed drum 38, in particular on the central tube 42 by, for example, two ball bearings 148.

A rotary distributor 150 actuatable by a machine control system, not illustrated in the drawings, is provided for controlling the drive of the hydraulic motor, in particular for switching over the direction of rotation of the latter.

A locking show 152 is additionally provided to enable fixing of the bearing ring assemblies 70a to f in their end position. As illustrated in FIGS. 8 and 11, the locking shoe 152 is non-rotatably guided as continuation of the pinion shaft 94 in the engagement opening 62 by, for example, a groove 154 and a tongue 156. This locking shoe 152 comprises a locking nose 158 which is engageable with the toothings 84 of the bearing ring assemblies 70a to f standing in the end position, but is thereby only in engagement with the last bearing ring assembly 70 in the end position, as illustrated, for example, in FIG. 8 with bearing ring assembly 70e, so that in the example of 35 the locked bearing ring assembly 70e, the bearing ring assemblies 70a to d are likewise held exactly in their end position by the bearing ring assembly 70e being held locked and by the fixed ring assembly 92. The locking shoe 152 is preferably held on a shaft continuation 160 of the pinion shaft 94 extending in the forward direction 98 beyond the end section 110 of the latter and is likewise movable together with the pinion shaft 94 so that the locking shoe 152 travels in the same way as the pinion shaft 94 between the initial position and the end position and, consequently, likewise locks the bearing ring 70 placed in the end position with respect to rotation about the longitudinal axis 80 of the threaded channel 56.

The statements hereinabove referred exclusively to the arrangement of the bearing ring assemblies in the threaded channel 56 and to their drive.

However, since the bar stock 30 is only guided radially in relation to the longitudinal direction in the guide bushings 78 and is rotatable about the longitudinal axis, it was not yet specified how feed of the bar stock 30 in the individual threaded channels 56 is carried out.

As shown in FIG. 3, a feed rod 170 is provided for this purpose. As illustrated in FIG. 8, the feed rod 170 comprises at a front end 172 a pusher head 174 with a pusher nose 176 for acting upon a rear end face 178 of the bar stock 30.

The pusher head 174 has a diameter corresponding to that of the bar stock 30 and so can likewise be guided through the guide bushings 78.

In addition, however, the last bearing ring assembly 70f is provided on its side facing away from the lathe 12 with a centering bushing 180 which guides the pusher head 174 until the last bearing ring assembly 70f has reached its end position. Only then does the pusher head 174 penetrate further in the forward direction 98 successively into the guide bushings 78 of the bearing ring assemblies 70f and push the bar stock 30 further in the forward direction into the respective spindle 14.

At its rear end 182, the feed rod 170 is held on a threaded feed ring 184 which is of the same design as the threaded rings 72 and is likewise guided in the threaded channel 56. The threaded feed ring 184 is held by the threaded channel 56 and the cooperation of its thread course 186 with the thread courses 58 of the threaded channel in a plane 188 which lies parallel to the planes 90a to f of the bearing ring assemblies 70a to f.

Furthermore, the threaded feed ring 184 is also provided with a toothing 190 which is identical with the toothing 84 of the threaded rings 72 and so the threaded feed ring 184 is driven by the pinion shaft 94 in the same way as the threaded rings 72, but independently of whether the pinion shaft 94 is in its initial position or its end position, the threaded feed ring 184 is driven by the pinion shaft 94 in a position in alignment with the threaded rings 72.

As illustrated in FIG. 3, the length of the feed rod 170 is selected such that when its pusher nose 176 rests against the rear end face 178 of the bar stock 30, the threaded feed ring 184 is arranged in an end section 194 which is held adjoiningly on the rear end 192 of the half shells 52 and 54 forming the threaded channel and continues the threaded channel 56. The end section 194 is in the form of a bearing shell for the threaded feed ring 184 and comprises the thread courses 58 of the channel 56 in continuation so the threaded feed ring 184 can be fully driven by rotation thereof in the threaded channel 56 into the end section 194 and be positioned therein.

As illustrated in FIG. 2, this end section 194 is provided in an end section housing 196 which, for its part, is movable in the direction of the longitudinal axis 80 away from the rear end 192 and is pivotably held by parallelogram guide rods 198 on the rear supporting unit 36.

Hence by rotation of the pinion shaft 94, the threaded feed ring 184 can, as illustrated in FIG. 7, be driven into the end section 194 of the threaded channel 56, the end section housing 196 moved away from the end 192 and, as illustrated in FIG. 2, pivoted by the parallelogram guide rods 198. The parallelogram guide rods 198 are arranged such that the feed rod 170 is still held parallel to the longitudinal axis 80, but can be pivoted in laterally offset relation out of the threaded channel 56 in the X-carriers 46, as illustrated in FIG. 2.

Bar stock 30 is placed in such a threaded channel when the bearing ring assemblies 70a to f are in the end position and the threaded feed ring 184 has been driven into the end section 194 and, for this purpose, the end section housing 196 together with the feed rod 170 is, in addition, pivoted in the lateral direction, as illustrated in FIG. 2.

A loading means 200 arranged along the side of the stock feed drum 38 comprises a chute 202 on which bar stock 30 can be stored as well as a pivot stand 204 which carries at its front end a top guide rod 206 and arranged below the latter a bottom guide rod 208. Loading arms 210 are held on the top guide bar 206 displaceably in the longitudinal direction of the latter, but non-rotatably with respect thereto. The loading arms 210 comprise prisms 212 for receiving bar stock 30 which is to be inserted in a threaded channel 56. The prisms 212 can be positioned in the threaded channel 56 by pivoting of the pivot stand 204 from a position of rest indicated in dot-and-dash lines in FIG. 12 into an insertion position indicated in continuous lines in FIG. 12, such that the bar stock held by the prisms 212 is in alignment with the centering bushing 180 and with the guide bushings 78 of the baring ring assemblies 70a to f. Furthermore, a push-in arm 214 is held on the bottom guide rod 208 so as to be displaceable along this guide rod 208 but non-rotatable. The push-in arm 214 engages around a front end 216 of the prisms 212 and comprises a pusher plate 218 which is displaceable over the prisms 212 to insert the bar stock 30 held by the prisms 212 in the direction of the lathe 12 into the centering bushing 180 and the guide bushings 78.

As illustrated in FIG. 13, in the insertion position the loading arms 210a to f are arranged at a spacing C from one another so they support the bar stock 30 to be inserted at equal spacings.

The push-in arm 214 with the pusher plate 218 is arranged behind the last loading arm 210f so the pusher plate 218 lies against the rear end face 178 of the bar stock 30.

By a pull member 220 which is actuatable by a pull drive, not illustrated in the drawings, engaging the push-in arm 214, the bar stock 30 is displaced in the forward direction 98 until the rear end face 178 of the bar stock 30 is displaced by an amount in the forward direction 98 which allows the feed rod 170 to pivot back. Hence the bar stock 30 is already pushed in through all of the guide bushings 78 and also through the centering bushing 180 and, as a rule, already advanced as far as the corresponding spindle.

In this position, the bar stock is held by the pusher plate 218 while the bearing ring assemblies 70a to f are successively moved from the end position into the initial position by the pinion shaft 94, as illustrated in FIG. 14. For example, the last bearing ring assembly 70f pushes the loading arms 210a to e in the direction towards the last loading arm 210f into a set which, as illustrated in FIG. 14, with the bearing ring assemblies 70a to f again standing in the initial position, is positioned behind the last bearing ring assembly 70f, while the push plate 218 continues to hold the bar stock 30 in this advanced position. It is, however, also conceiveable for the loading arms 210a to e to be pushed together into a set by separate drive means.

With the loading arms 210 pushed together and the push-in arm 214 pushed forwards, the pivot stand 204 is pivoted back from an insertion position into the position of rest and in this position of rest the push-in arm 214 is driven back into its rear position again by the pull member 220, while the loading arms 210a to e are positioned again with the spacings C by a pull member 222 and a drive, not illustrated in the drawings, and, for this purpose, the front loading arm 210a is driven into its front end position again so the loading arms 210 and the push-in arm 214 are standing in the position illustrated in FIG. 13 for insertion of a further bar.

After the pivot stand has been pivoted out from the insertion position into the position of rest, the feed rod 170 can be pivoted in by the end section housing 196 being pivoted back. The end section 194 is then in alignment again with the threaded channel 56 and so by slight forward movement of the end section housing 196 in the direction of the end 192, the feed rod 170 is pushed with the pusher head 174 into the centering bushing 180 until the pusher nose 176 rests against the rear end face 178 of the bar stock 30.

The inventive bar stock feeding means operates as follows:

Starting with the bearing ring assemblies 70a to f in the initial position and the feed rod 170 (FIG. 3) with its pusher nose 176 resting against the rear end face of a bar 30 guide through the guide bushings 78 concentrically with the longitudinal axis 80 of the threaded channel 56, feed of the bar stock 30 for turning on the lathe can be carried out by the pinion shaft 94 being driven by the hydraulic motor 140 such that the feed rod 170 is moved in the forward direction 98 at the same speed as the bearing ring assemblies 70a to f owing to the threaded feed ring 184 likewise being driven by the pinion shaft. The bar stock 30 is displaced in accordance with the length of the workpiece to be machined in the work area. During the next work cycle, the bar stock 30 is, in turn, fed by the length of the workpiece required in the work area so the front bearing ring assembly 70a and then the following bearing ring assemblies successively reach the end position—as illustrated, for example, in FIG. 5 bearing ring assemblies 70a to c —while the bearing ring assemblies 70d to f are still arranged at a spacing from one another. This feed of the bar stock 30 is carried out until all of the bearing ring assemblies 70a to f have reached their end position, as illustrated in FIG. 8, but the pusher head 174 of the feed rod 170 is still guided in the centering bushing 180.

The positioning of the bearing ring assemblies in the end position as described in detail hereinabove and the rotationally fixed locking thereof by the locking shoe 152 likewise movable in the direction opposite to the forward direction 98 are effected by the stepwise further movement of the area of engagement 120 of the external toothing 96 of the pinion shaft 94 into the toothing 84 of the bearing ring assemblies 70a to f.

After the last bearing ring assembly 70f is placed in the end position, the threaded section 102 has left the threaded rod 104, as illustrated in FIG. 10 and likewise described hereinabove, and engages around the thread-free section 108 while the end face 132 is held by the holding magnet 130 and hence the pinion shaft 94 is fixed in the end position.

To use up the remainder of the bar stock 30, the pinion shaft 94 is driven further in the same direction so the threaded feed ring 184 advances the feed rod 170 further and hence the pusher head 174 travels successively through the guide bushings 78 of the bearing ring assemblies 70f to a and, in the given circumstances, reaches the corresponding spindle 14 to push the feed rod completely through the latter. This driving of the feed rod 170 is made possible without any problems by the holding of the pinion shaft 94 in the end position as illustrated in FIG. 10.

The feed rod 170 is preferably advanced so far that the threaded feed ring 184, as illustrated in FIG. 6, rests against the centering bushing 180 and the feed rod is just pushed out into a collet of the corresponding spindle 14.

To load the threaded channel 56 with a new bar 30, the hydraulic motor 140 is switched over and the pinion shaft 94 now moves the threaded feed ring 184 in the direction opposite to the forward direction 98 into the end section 194 in which the threaded feed ring 184 continues to hold the feed rod 170 in alignment with the guide bushings 78 and the centering bushing 180. This position is illustrated in FIG. 7.

By displacement of the end section housing 196 away from the end 192 and pivoting thereof by means of the parallelogram guide rods 188, as illustrated, for example, in FIG. 2, the entire threaded channel 56 in the region between the centering bushing 180 and the rear end 192 of the half shells 52 and 54 now becomes free for insertion of the bar stock 30 by the loading means 200 with, as illustrated in FIG. 13, the loading arms 210a to f distributed over this region holding the bar stock deposited from the chute 202 into the prisms 212 and aligning in the insertion position this bar stock in a centered position in relation to the centering bushing 180 and the guide bushings 78. With the bar stock in this alignment, by means of the pusher plate 218 and the pull member 220 acting on the push-in arm 214, the pusher plate 218 is moved away from its rear position, illustrated in FIG. 13, in the forward direction 98 through a distance which corresponds to the length of the feed rod 170 so the bar stock 30 is pushed into the centering bushing 180 and the guide bushings 78.

With the pusher plate 218 fixed at approximately the level of the pusher nose 176, the bearing ring assemblies 70a to f are now moved back into their initial position and push the loading arms 210a to e together, as described hereinabove, in the direction opposite to the forward direction. The push bar 134 is provided for coupling the pinion shaft for this purpose with the individual bearing ring assemblies 70 placed in the end position. The push bar 134 moves the pinion shaft 94 in the forward direction 98 until the threaded section 102 is in engagement with the threaded rod 104 and hence the pinion shaft 94 travels from the end position with its area of engagement 120 stepwise with steps of the height H in the forward direction and hence becomes coupled with the individual bearing ring assemblies 70a to f one after the other, with coupling with the following bearing ring assembly only occurring when the preceding bearing ring assembly is positioned at the spacing A so the bearing ring assemblies 70a to f finally all exhibit the spacing A from one another in the initial position.

In this position, the bar stock 30 is held by the bearing ring assemblies 70a to f and the pivot stand 204 can now be pivoted back into the position of rest. The end section housing 196 is pivoted inwards with the feed rod 170 until the feed rod 170 is in alignment with the already inserted bar stock 30.

The end section housing 196 is then moved in the direction of the longitudinal axis 80 towards the rear end 192 of the half shells 52 and 54 so the end section 194 is again part of the threaded channel 56.

By this movement of the end section housing 196 in the direction of the longitudinal axis 18 toward the lathe 12, the pusher head 174 is pushed into the centering bushing 180 until the pusher nose 176 rests against the rear end face 178 of the bar stock 30.

If the pinion shaft 94 is now driven again so that the bearing ring assemblies 70a to f are moved in the forward direction 98, the feed rod is simultaneously advanced with the threaded feed ring 184 in the manner described hereinabove so the bar stock can be fed anew.

In the inventive embodiment of a bar stock feeding means comprising a stock feed drum 38, as illustrated in FIG. 2, the stock feed drum 38 preferably has a switching position in which loading with a bar 30 can be carried out. Associated with this position is likewise only the end section housing 196 with the end section and, in addition, the loading means 200.

A second embodiment of an inventive bar stock feeding means, illustrated in FIG. 15 and designated in its entirety 230, comprises instead of the stock feed drum 38 only a threaded channel 56 formed by two half shells 52 and 54, with all of the parts with respect to one of the threaded channels 56 being used identically and this threaded channel then always being positioned relative to a loading means 200 such that the bar stock held by the prisms 212 is aligned with the guide bushings 78 and the centering bushing 180 of the bearing ring assemblies 70a to f by the pivot stand 204 being pivoted into the insertion position.

The present disclosure relates to the subject matter disclosed in German application No. P 40 00 594.4 of Jan. 11, 1990, the entire specification of which is incorporated herein by reference.

I claim:

1. Bar stock feeding means for machine tools comprising a longitudinal guide means on which several holders which each receive the bar stock in a guide means are held for movement in the longitudinal direction of said longitudinal guide means, and a drive means with which said holders are displaceable from an initial position in which they exhibit a maximum spacing from one another in the longitudinal direction into an end position on the machine tool side in which they exhibit a minimum spacing from one another in the longitudinal direction, characterized in that said longitudinal guide means comprises a guide element (56) having a longitudinal thread (58), in that said holders (70a to f) are held in parallel alignment with one another by threaded rings (72) engaging said longitudinal thread (58), and in that said holders (70a to f) are movable in the longitudinal direction (80) between the initial position and the end position by a relative rotation between said guide element (56) and said threaded rings (72) initiated by said drive means.

2. Bar stock feeding means as defined in claim 1, characterized in that said longitudinal guide means comprises a guide channel (56).

3. Bar stock feeding means as defined in claim 2, characterized in that said guide element is a threaded channel (56) forming said guide channel.

4. Bar stock feeding means as defined in claim 3, characterized in that said threaded channel (56) is formed by two threaded channel segments (52, 54) divided in said longitudinal direction (80).

5. Bar stock feeding means as defined in claim 1, characterized in that said threaded rings (72) are provided with at least one thread course (88) on their circumferential outer side.

6. Bar stock feeding means as defined in claim 3, characterized in that said threaded channel (56) is a multiple-pitch coarse thread.

7. Bar stock feeding means as defined in claim 1, characterized in that said guide element (56) is held nonrotatably on a frame (38) of said feeding means, and in that said threaded rings (72) are rotatable relative to said frame (38).

8. Bar stock feeding means as defined in claim 1, characterized in that said drive means (140) drives all of said threaded rings (72) at the same speed and interrupts the drive when the respective end position is reached.

9. Bar stock feeding means as defined in claim 1, characterized in that said threaded rings (72) comprises an external toothing (84) in which a drive element (94) engages.

10. Bar stock feeding means as defined in claim 9, characterized in that said external toothing (84) differs from said thread (88).

11. Bar stock feeding means as defined in claim 1, characterized in that a single drive element (94) is provided for all of said threaded rings (72).

12. Bar stock feeding means as defined in claim 11, characterized in that said drive element (94) is arranged between said two threaded channel segments (52, 54).

13. Bar stock feeding means as defined in claim 11 characterized in that in the end position, said threaded rings are free from a rotary connection with said drive element (94) but in all other positions are in rotary connection with said drive element (94).

14. Bar stock feeding means as defined in claim 13, characterized in that said drive element (94) is displaceable in said longitudinal direction (80) from an initial position in which it is in rotary connection with all of said threaded rings (72) via individual intermediate positions in which it is free from a rotary connection with those threaded rings (72) standing in the end positions, into an end position in which it is free from a rotary connection with all of said threaded rings (72).

15. Bar stock feeding means as defined in claim 14, characterized in that said drive element (94) is fixable in said end position with respect to its longitudinal movability.

16. Bar stock feeding means as defined in claim 11, characterized in that said drive element is a pinion shaft (94) with an external toothing (96).

17. Bar stock feeding means as defined in claim 16, characterized in that said rotary connection can be established by engagement of said pinion shaft (94) in said external toothing (84) of said threaded rings (72).

18. Bar stock feeding means as defined in claim 11, characterized in that said drive element (94) is displaceable by a displacement means (102, 104) in said longitudinal direction (80) of said guide element (56).

19. Bar stock feeding means as defined in claim 18 characterized in that a foremost area of engagement (120) of said drive element (94) engageable with said threaded rings is displaceable by step drive elements (102, 104, 114) in individual steps in said longitudinal direction (80).

20. Bar stock feeding means as defined in claim 19, characterized in that the thickness (D) of said holders (70a to f) in said longitudinal direction (80) of said guide element (56) is an integral multiple of one step.

21. Bar stock feeding means as defined in claim 19, characterized in that said step drive elements are formed by a thread (102, 104) continuously displacing said drive element (94) in said longitudinal direction (80) and by an end section (110) of said drive element (94), said end section being designed as a screw thread (114) having a thread pitch which extends in the same direction.

22. Bar stock feeding means as defined in claim 21, characterized in that the pitch (H) of said screw thread (114) corresponds to the pitch of said thread (102, 104) displacing said drive element (94).

23. Bar stock feeding means as defined in claim 1, characterized in that said threaded rings (72) are lockable in said end position.

24. Bar stock feeding means as defined in claim 23, characterized in that a locking shoe (152) displaceable in said longitudinal direction (80) is provided for the locking.

25. Bar stock feeding means as defined in claim 24, characterized in that said locking shoe (152) fixes the respective last threaded ring (72) placed in the end position.

26. Bar stock feeding means as defined in claim 24, characterized in that said locking shoe (152) engages in said external toothing (84) of said threaded rings (72) standing in the end position and fixes them in a rotationally fixed manner relative to said guide element (56).

27. Bar stock feeding means as defined in claim 9, characterized in that in the end position said threaded rings (72) are arranged with their external toothings (84) in alignment.

28. Bar stock feeding means as defined in claim 24, characterized in that said locking shoe is guided in a rotationally fixed manner.

29. Bar stock feeding means as defined in claim 25, characterized in that said locking shoe (152) is held on a front end of said drive element (94).

30. Bar stock feeding means as defined in claim 3, characterized in that said guide means (78) for said bar stock (30) are arranged in said threaded channel (56).

31. Bar stock feeding means as defined in claim 3, characterized in that said holders (70a to f) are enclosed by said threaded channel (56) and are provided with said threaded rings (72) on their circumferential outer side.

32. Bar stock feeding means as defined in claim 3, characterized in that said guide means (78) for said bar stock (30) hold the latter in coaxial alignment with said threaded channel (56).

33. Bar stock feeding means as defined in claim 3, characterized in that said threaded channel (56) comprises a loading opening (60) extending in said longitudinal direction (80) for said bar stock (30).

34. Bar stock feeding means as defined in claim 33, characterized in that said drive element (94) is arranged opposite said loading opening (60).

35. Bar stock feeding means as defined in claim 1, characterized in that a feed rod (1700 displaceable in said longitudinal direction (80) is provided.

36. Bar stock feeding means as defined in claim 35, characterized in that said feed rod (170) is held on a threaded feed ring (184) which is held in accordance with said threaded rings (72) on said guide element (56).

37. Bar stock feeding means as defined in claim 35, characterized in that said feed rod (170) is advanced jointly with said holders (70a to f).

38. Bar stock feeding means as defined in claim 36, characterized in that in both said initial position and said end position, said drive element (94) is in engagement with said threaded feed ring (184) so long as it is positioned in a feed position for displacement coaxially with said threaded rings (72).

39. Bar stock feeding means as defined in claim 35, characterized in that in a retracted position, said feed rod (170) can be moved from a feed position in alignment with said guide means (78) into a loading position.

40. Bar stock feeding means as defined in claim 39, characterized in that said feed rod (170) is pivotable from said feed position into said loading position.

41. Bar stock feeding means as defined in claim 40, characterized in that a pivoting means (196, 198) is provided for bringing said feed rod (170) into said loading position which is laterally offset parallel to said feed position.

42. Bar stock feeding means as defined in claim 41, characterized in that said pivoting means pivots an end section (194) of said guide element (56) which receives said threaded feed ring (184) in the retracted position and in which said threaded feed ring (184) is positionable.

43. Bar stock feeding means as defined in claim 1, characterized in that several longitudinal guide means (70a to f) are combined in a stock feed drum (38).

44. Bar stock feeding means as defined in claim 43, characterized in that said stock feed drum (38) is rotationally fixedly connected to a spindle drum (16) of said machine tool (12).

45. Bar stock feeding means as defined in claim 1, characterized in that a loading means (200) is provided for said bar stock (30).

46. Bar stock feeding means as defined in claim 45, characterized in that said loading means (200) comprises loading arms (210) which can be pivoted into said guide channel (56) through said loading opening (60).

47. Bar stock feeding means as defined in claim 46, characterized in that said loading arms (210) comprise prisms (212) with which bar stock (30) is positionable in alignment with said guide means (78).

48. Bar stock feeding means as defined in claim 45, characterized in that said loading means (200) comprises a push-in arm (214) which is movable in said longitudinal direction (80) of said guide element (56).

* * * * *

UNITED STATES PATENT AND TRADEMARK OFFICE
CERTIFICATE OF CORRECTION

PATENT NO. : 5,115,702

DATED : May 26, 1992

INVENTOR(S) : Helmut F. LINK

It is certified that error appears in the above-identified patent and that said Letters Patent is hereby corrected as shown below:

ON THE TITLE PAGE

[57] ABSTRACT:

Line 18, "relatively" should read -- relative --; and

Lines 20-21, delete the second occurrence of "initiated by the drive means.".

Column 2, line 14, "is to" should read -- may --;

Column 3, line 66, "are" should read -- area --;

Column 8, line 10, "ring assemblies" should read -- rings --;

Column 8, line 10, "rings" should read -- ring assemblies --;

Column 8, line 17, "coursed" should read -- courses --;

Column 8, line 22, "rings" should read -- ring assemblies --;

Column 8, line 53, "ring assemblies" should read -- rings --;

Column 8, line 53, "rings" should read -- ring assemblies --;

UNITED STATES PATENT AND TRADEMARK OFFICE
CERTIFICATE OF CORRECTION

PATENT NO.  : 5,115,702

DATED       : May 26, 1992

INVENTOR(S) : Helmut F. LINK

It is certified that error appears in the above-identified patent and that said Letters Patent is hereby corrected as shown below:

Column 8, line 68, "second bearing ring" should read -- second bearing ring assembly --;

Column 9, line 57, "reacted" should read -- reached --;

Column 10, line 7, "spacing" should read -- spacings --;

Column 10, line 15, "assemblies" should read -- assembly --;

Column 10, line 23, "f" should read -- of --;

Column 10, line 55, "s" should read -- so --;

Column 11, line 24, "show" should read -- shoe --;

Column 11, line 39, delete "assembly";

Column 11, line 47, after the word "ring" insert -- assembly --;

Column 13, line 8, "baring" should read -- bearing --;

Column 14, line 8, "guide" should read -- guided --; and

Column 16, line 14, the German application No. should read -- P 40 00 598.4 --.

Column 16, line 66, "comprises" should read -- comprise --; and

UNITED STATES PATENT AND TRADEMARK OFFICE
CERTIFICATE OF CORRECTION

PATENT NO. : 5,115,702
DATED : May 26, 1992
INVENTOR(S) : Helmut F. LINK

It is certified that error appears in the above-identified patent and that said Letters Patent is hereby corrected as shown below:

Column 18, line 40, delete "(1700".

Delete all of the reference numerals and related parentheses in all claims.

Signed and Sealed this

Twelfth Day of October, 1993

Attest:

BRUCE LEHMAN

Attesting Officer

Commissioner of Patents and Trademarks